United States Patent [19]

LaMontagne

[11] Patent Number: 4,505,503
[45] Date of Patent: Mar. 19, 1985

[54] LOCKING FASTENER

[75] Inventor: Robert R. LaMontagne, Liverpool, N.Y.

[73] Assignee: Fargo Mfg. Company, Inc., Poughkeepsie, N.Y.

[21] Appl. No.: 366,610

[22] Filed: Apr. 8, 1982

[51] Int. Cl.³ .............................................. B65D 33/34
[52] U.S. Cl. .................................................... 292/315
[58] Field of Search .............. 292/308, 315, 316, 326, 292/311; 70/53

[56] References Cited

U.S. PATENT DOCUMENTS

| 17,802 | 7/1857 | Mear et al. | 292/308 |
| 298,665 | 5/1884 | Brooks | 292/308 |
| 625,836 | 5/1899 | Dela Mar | 292/311 |
| 757,809 | 4/1904 | Houghton | 339/270 R |
| 1,911,060 | 5/1933 | Clark | 292/307 R |
| 1,943,988 | 1/1934 | Peake | 292/318 X |
| 2,602,104 | 7/1952 | Hubbell et al. | 339/272 VC |
| 3,330,586 | 7/1967 | Becker | 292/315 |
| 4,312,529 | 1/1982 | Gillette | 292/315 |
| 4,342,477 | 8/1982 | McClure | 292/307 R |

Primary Examiner—Richard E. Moore
Attorney, Agent, or Firm—Kane, Dalsimer, Kane, Sullivan & Kurucz

[57] ABSTRACT

A locking fastener for securing bundles of cable, forming linkage type connections, and the like, having a removable locking member with two end portions adapted to being slidably inserted into a clamp body and gripped therein by a locking means.

4 Claims, 4 Drawing Figures

4,505,503

LOCKING FASTENER

This application relates generally to the field of fastening devices and in particular to tamperproof locking clamps and connectors.

Modern industrial technology provides innumerable applications for fastening devices as is evident from the variety of these devices on the market. The key features for commerical acceptance of such devices are economical advantages, user convenience, reliability, and durability.

The present invention provides a new and useful fastener having a particularly advantageous design with respect to the above and other features representing a significant advance over the prior art.

Economical advantages emanating from efficient design resulting in ease of manufacture, economical use of materials, space and equipment make the present invention generally less costly than prior art alternatives.

Simple design and efficient operation of parts make the present invention easy to use reducing the possiblity of improper installation. The positive locking feature provides a tight fit and insures against accidental loosening of the fastener caused by vibration of loose fitting usually associated with extruded mechanical parts. Fabrication from modern materials such as high strength polymeric materials, aluminum, other metals, and metal alloys renders the device resistant to corrosion and other adverse environmental conditions. Consequently, the present invention is more reliable and durable than comparable prior art fasteners.

Referring to the accompanying drawings showing one, but obviously not the only form of embodiment of the present invention.

Like parts are indicated by the same reference numerals throughout the drawings.

Figure 1:
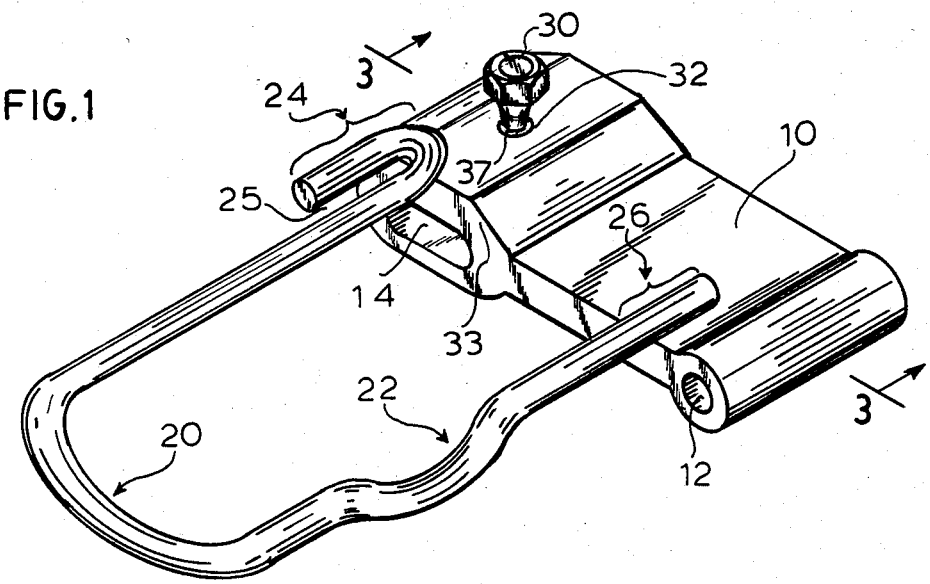
FIG. 1, is an isometric view of an embodiment of the present invention.

Referring, specifically, to FIG. 1 showing the three principal parts of an embodiment of the present invention, that is, the clamp body 10 engaged with locking screw 30 and locking member 20 separated therefrom.

Figure 3:
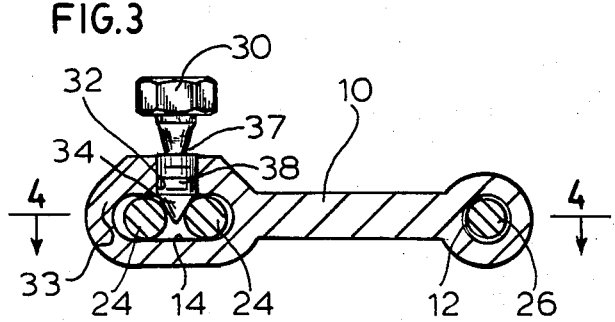
FIG. 3, is a cross-sectional view along line 3—3 of FIG. 1.
Figure 4:
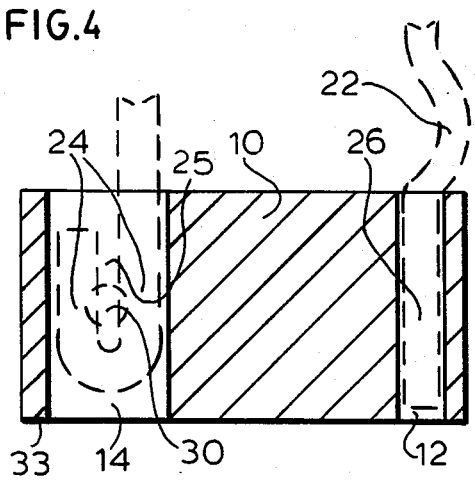
FIG. 4, is a fragmentary cross-sectional view along line 4—4 of FIG. 3.
Figure 2:
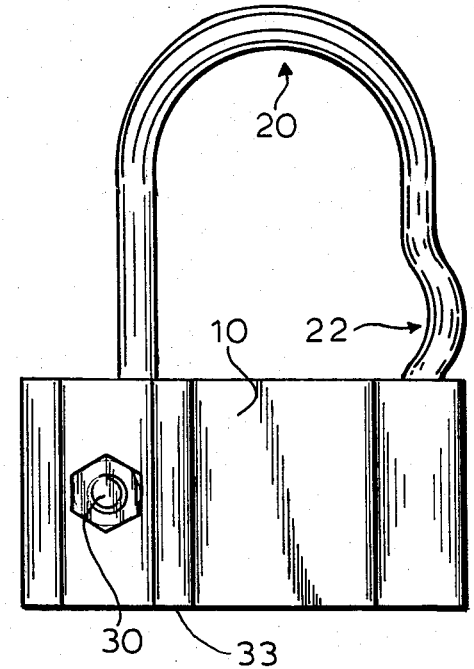
FIG. 2, is a frontal view of the embodiment of the present invention shown in FIG. 1.

The various parts are formed by extrusion from the following materials or combinations thereof metals especially aluminum, metal alloys, or polymeric materials. The clamp body 10 is provided with first and second openings 12 and 14 for engaging locking member 20 at two points. To effect engagement of locking member 20, with clamp body 10 as shown in FIGS. 2, 3, and 4; the first end portion 26 is inserted into first opening 12. Preferably, the first end portion 26 is provided with a knuckle 22 or the like to prevent insertion of locking member 20 into clamp body 10 beyond a chosen point and further it has a shape complimentary to the first opening 12 but slightly smaller to facilitate its insertion but minimizing lateral movement.

The opposite end of the locking member 20 is bent into second end portion 24, that is, a tight closed U shape forming a channel 25 therein. The second end portion 24 is adapted to being slidably inserted into second opening 14 of complimentary shape in clamp body 10 simultaneous with, and in the same manner as, first end portion 26 is inserted into first opening 12. The clamp body 10 engaged with the locking member 20 forms the completed fastener structure in the closed position as shown in FIG. 2. The locking screw 30 disposed in and threadably engaged with screw opening 32 in clamp body 10, as shown, may be tightened by clockwise turning causing its innermost end 34 (preferably pointed) to abut or wedge itself into channel 25 thereby tightly securing the locking member 20 within the clamp body 10. Preferably, the clamp body 10 is provided with a thickened section 33 in the area where locking screw 30 passes through it to create increased thread engagement area and consequent greater strength.

Furthermore, locking screw 30 is provided with a weakened section, e.g. a narrow zone 37 between its head 36 and threads 38. Thereby a closing or tightening force greater than some predetermined value will shear the screw at the narrow zone 37. In this mode, the locked, completed fastener structure is relatively tamperproof.

It will be appreciated that the chance of accidental release of the closed fastener structure is reduced even when the locking screw 30 is not completely tightened because the catch 27 formed by the closed end of channel 25 will engage the innermost end 34 of locking screw 30 preventing it from slipping out of second opening 14.

It will be further appreciated that design symmetry with respect to the openings for receiving locking member 20 permits insertion on either side of clamp body 10 without affecting the operation of the completed fastener structure.

While, in order to comply with the statute, this invention has been described in language more or less specific, as to structural features, it is to be understood that the invention is not limited to the specific features shown, but that the means and construction herein disclosed comprise one of several modes of putting the invention into effect and the invention is therefore claimed in any of its forms or modifications within the legitimate and valid scope of the appended claims.

What is claimed is:

1. A fastening device, which comprises:
   a rigid locking member terminating in a first end portion and a second end portion with said portions being maintained at a predetermined distance from each other;
   a clamp body having a first opening adapted to slidably receiving the first end portion of the locking member and a second opening adapted to slidably receiving the second end portion of the locking member;
   a U-shaped channel comprising at least one of either said first or second end portions of the locking member;
   a locking means comprising a threaded locking screw threadable in a threaded bore disposed within at least one of either the first or second openings in the clamp body so that a tightening down of the screw in the bore causes the screw to engage and secure the channel in the clamp body, and said threaded locking screw includes a weakened section that will shear when a predetermined closing force is applied to the threaded locking screw as it is being tightened down so as to render the device relatively tamperproof.

2. A fastening device as recited in claim 1 wherein the clamp body has a thickened section where the threaded bore for the locking screw passes through it.

3. A fastening device as recited in claim 1 wherein the locking member is provided with a means for preventing the first and second end portions of the locking member from sliding into the first and second openings in the clamp body beyond a predetermined point.

4. A fastening device as recited in claims 1, 2, or 3 wherein the first and second openings pass through the clamp body forming corresponding third and fourth openings on the opposite side of the clamp body suitable for receiving the locking member in the same manner as the first and second openings.

* * * * *